United States Patent
Kim

(10) Patent No.: US 8,261,394 B2
(45) Date of Patent: Sep. 11, 2012

(54) APPARATUS FOR MOVING TUNNEL PART OF BOARDING BRIDGE

(75) Inventor: Ju Ryong Kim, Seoul (KR)

(73) Assignee: Otis Elevator Company, Farmington, CT (US)

( * ) Notice: Subject to any disclaimer, the term of this patent is extended or adjusted under 35 U.S.C. 154(b) by 226 days.

(21) Appl. No.: 12/743,826

(22) PCT Filed: Dec. 18, 2008

(86) PCT No.: PCT/US2008/087326
§ 371 (c)(1),
(2), (4) Date: May 20, 2010

(87) PCT Pub. No.: WO2009/079614
PCT Pub. Date: Jun. 25, 2009

(65) Prior Publication Data
US 2010/0257679 A1  Oct. 14, 2010

(30) Foreign Application Priority Data

Dec. 18, 2007 (KR) .................. 10-2007-0133015
Dec. 27, 2007 (KR) .................. 10-2007-0138660

(51) Int. Cl.
*B64F 1/30* (2006.01)
(52) U.S. Cl. .......................... 14/71.5; 14/71.1
(58) Field of Classification Search ............. 14/71.1, 14/71.3, 71.5
See application file for complete search history.

(56) References Cited

U.S. PATENT DOCUMENTS 3,581,331 A * 6/1971 Fisher et al. ................ 14/71.5
(Continued)

FOREIGN PATENT DOCUMENTS
DE  3532657 A1  3/1987
(Continued)

OTHER PUBLICATIONS

International Search Report and Written Opinion of the International Searching Authority for International application No. PCT/US2008/087326 mailed Nov. 18, 2009.

(Continued)

*Primary Examiner* — Gary S Hartmann
(74) *Attorney, Agent, or Firm* — Carlson, Gaskey & Olds PC

(57) ABSTRACT

An exemplary apparatus is for moving a tunnel part of a boarding bridge equipped with a tunnel (100) that consists of a first tunnel part (110), a second tunnel part (120), and a third tunnel part (130) in sequence from one side and can be moved so that the second tunnel part (120) and third tunnel part (130) are placed in contact and are connected to each other based on the first tunnel part (110). The apparatus includes a first rope (210) with one end coupled with the first tunnel part (110) and its other end coupled with the third tunnel part (130). A first pulley (220) that fixedly coupled to the second tunnel part (120) by hooking the first rope (210) at a position that is separated toward the other end side rather than both ends of the first rope (210) and is interlocked and moved in accordance with the moving displacement of the other end of the first rope (210). A second rope (230) is installed separately from the first rope (210) with one end coupled with the first tunnel part (110) and its other end coupled with the third tunnel part (130). A second pulley (240) is fixedly coupled to the second tunnel part (120) by hooking the second rope (230) at a position that is separated toward one end side rather than both ends of the second rope (230) and is interlocked and moved in accordance with the moving displacement of the other end of the second rope (230).

13 Claims, 12 Drawing Sheets

U.S. PATENT DOCUMENTS

| | | | | |
|---|---|---|---|---|
| 4,044,902 A | * | 8/1977 | Eitel | 414/680 |
| 4,094,381 A | * | 6/1978 | Wilkerson | 182/66.1 |
| 4,217,987 A | * | 8/1980 | Gattu et al. | 212/299 |
| 4,363,413 A | * | 12/1982 | Gyomrey | 212/262 |
| 4,366,591 A | * | 1/1983 | Zimmerman | 14/71.3 |
| 4,369,538 A | * | 1/1983 | Smedal | 14/69.5 |
| 4,396,093 A | * | 8/1983 | Zimmerman | 182/208 |
| 4,526,090 A | | 7/1985 | Maier | |
| 4,616,225 A | * | 10/1986 | Woudenberg | 340/908 |
| 4,715,077 A | * | 12/1987 | Shepheard | 14/71.5 |
| 6,330,726 B1 | * | 12/2001 | Hone et al. | 14/71.5 |
| 7,090,086 B2 | * | 8/2006 | Dupre et al. | 212/350 |

FOREIGN PATENT DOCUMENTS

| | | |
|---|---|---|
| EP | 2055632 A1 | 5/2009 |
| GB | 915856 | 1/1961 |
| WO | 8201729 | 5/1982 |

OTHER PUBLICATIONS

Extended European Search Report for Application No. EP 10 17 2819 mailed Jan. 13, 2011.

International Preliminary Report on Patentability for International application No. PCT/US2008/087326 mailed Jul. 1, 2010.

* cited by examiner

APPARATUS FOR MOVING TUNNEL PART OF BOARDING BRIDGE

TECHNICAL FIELD

The present invention pertains to an apparatus for moving a tunnel part of a boarding bridge. More specifically, the present invention pertains to an apparatus for moving a tunnel part of a boarding bridge that is coupled with a tunnel equipped with multiple tunnel parts, which can be placed in contact and connected to each other on a boarding bridge that is installed so that passengers can move conveniently between an airport building and an airplane, and stably moves the multiple tunnel parts.

DESCRIPTION OF THE RELATED ART

Boarding bridges are installed between an airport building and airplanes in an airport, provide passages in which passengers can move safely and conveniently from the airport building to the airplanes without being influenced by various weather conditions or the external environment, and have a structure in which the length can be expanded and contracted and the direction can be changed in accordance with the distance between the airport building and the airplanes and the position of the gateway door of the airplanes.

In general, a boarding bridge consists of a tunnel having multiple sections that can contact and be connected to each other so that a passage in which people can move is formed and the length can be regulated, a rotunda that functions as a rotational shaft so that the above-mentioned tunnel can be rotated in accordance with the position of an airplane, a lift column that lifts and lowers the above-mentioned tunnel in accordance with the size of the airplane and the position of the gateway door, and a cabin that is formed so that its orientation can be changed from the opposite side of the above-mentioned rotunda to the gateway side of the airplane.

If the above-mentioned tunnel (100) has three sections that can be placed in contact and connected to each other (hereinafter, called first tunnel part (110), second tunnel part (120), and third tunnel part (130)), the length of the tunnel (100) that is formed by the above-mentioned first tunnel part (110), second tunnel part (120), and third tunnel part (130) is adjusted when the above-mentioned second tunnel (120) and third tunnel part (130) are moved in a direction to be adjacent to or separate from one end of the above-mentioned first tunnel part (110) that maintains its fixed position.

A driving gear for expanding and contracting the above-mentioned tunnel and changing the direction is installed at the lower part of the above-mentioned lift column, and the above-mentioned lift column is coupled to the above-mentioned third tunnel part (130). Thus, the above-mentioned second tunnel part (120) does not directly receive pressure required for movement from the driving gear but indirectly receives pressure through the above-mentioned third tunnel part (130). In the prior art, in moving both the above-mentioned second tunnel part (120) and third tunnel part (130), multiple hooks having an operational structure in which they can be protruded and returned are separately installed in the longitudinal direction of the above-mentioned second tunnel part (120) or third tunnel part (130) on the above-mentioned second tunnel part (120) or third tunnel part (130), and the protrusion positions of the above-mentioned hooks are varied in accordance with the position of the above-mentioned third tunnel part (130), so that the above-mentioned third tunnel part (130) pushes the above-mentioned second tunnel part (120) by means of the above-mentioned hooks and contacts and connects the above-mentioned second tunnel part (120) to the above-mentioned first tunnel part (110) at a specific width.

However, according to the above-mentioned operational structure, at the moment of connection of the above-mentioned second tunnel part (120) and third tunnel part (130) by the above-mentioned hooks, noise is generated by the collision between the above-mentioned second tunnel part (120) and the hooks or between the above-mentioned third tunnel part (130) and the hooks, and impact is applied to the second tunnel part (120), the third tunnel part (130), and the hooks due to the collision with the above-mentioned hooks, so the apparatus life is lowered.

Then, only when the above-mentioned third tunnel part (130) pushes and moves the above-mentioned second tunnel part (120) by a designated displacement by pressure wherein the load and the frictional force of the above-mentioned second tunnel part (120) can be shared, since the above-mentioned second tunnel part (120) can be moved by the designated displacement, not only is an excessive load imposed on the above-mentioned lift column and driving gear, but the above-mentioned second tunnel part (120) and third tunnel part (130) cannot be rapidly moved.

FIG. 14 shows another example conventional general boarding bridge. It consists of a tunnel (1010) having multiple sections that form a passage in which people can move, and has multiple sections that can contact and connect with each other so that the length can be regulated, a rotunda (1020) that functions as a rotational shaft so that the tunnel (1010) can rotate according to the position of an airplane, a lift column (1030) that raises and lowers the tunnel (1010) according to the size of the airplane and the position of a gateway door, a cabin (1040) formed so that the direction to the gateway side of the airplane can be changed from the end opposite from the rotunda (1020), and a cable tray (1050) installed at the bottom of the tunnel (1010) to hold wiring cables.

The tunnel (1010) has two sections (hereinafter called a first tunnel part (1011) and a second tunnel part (1012), and as the second tunnel part (1012) is moved in the direction of adjacency to or separation from one end of the first tunnel part (1011) that maintains a fixed position, the length of the tunnel (1010) that is formed by both the first tunnel part (1011) and second tunnel part (1012) is changed.

To enable stably supplying power to the second tunnel part (1012) that is movably displaced from one end of the first tunnel part (1011) that maintains a fixed position, the cable tray (1050) has a structure in which both ends of a connection cable, for interconnecting a cable extending in the cable tray (1050) installed at the bottom of the tunnel part (1011) and a cable installed in the second tunnel part (1012), can be flexibly deformed to allow adjacency and separation.

FIG. 15 shows a cable tray for a boarding bridge of the prior art. The tray part (1051) provided with a holding surface capable of continuously guiding cables is installed on the bottom of the first tunnel part (1011), multiple roller members (1052) mounted on second tunnel part (1012) connected to or separated from the tray part (1051) according to the contact and connection distance between the first tunnel part (1011) and second tunnel part (1012), and the connection cable (1053) to the second tunnel part (1012) is installed such that it is bent between the tray part (1051) and the second tunnel part (1012).

The cable tray with the above-mentioned structure can be applied to a tunnel divided into two sections without problems. But when the cable tray is applied to a tunnel divided into three or more sections, since the multiple tunnel parts are moved together and the tunnel is formed with a designated length, if the above-mentioned structure is simply applied to each tunnel part, the multiple connection cables are spread apart and bent together in the process of reciprocating movement of the multiple tunnel parts, so that their paths are likely to overlap, causing entanglements with each other.

Also, installing wiring cables and connection cables to supply power to the multiple tunnel parts along paths independent of each other to prevent entanglements makes the structure of the cable tray complicated due to the multiple wiring paths, and the volume and weight are increased proportionally, so that not only are material and manpower consumption large, but maintenance and control is difficult.

SUMMARY

One feature of the disclosed example is that it allows for moving a tunnel part of a boarding bridge in which the apparatus life can be further improved by preventing noise generation due to an instantaneous change in the connection state of a second tunnel part and a third tunnel part and the application of impact on the second tunnel part and the third tunnel part by a forced connection.

Another feature of the disclosed example is that it allows for moving a tunnel part of a boarding bridge in which the load applied to a lift column and a driving gear is further reduced and the movement of the second tunnel part and the third tunnel part can be more rapidly and smoothly realized when the third tunnel part moves the second tunnel part by transmitting pressure.

An exemplary apparatus for moving a tunnel part that is installed in a boarding bridge equipped with a tunnel (100) that consists of first tunnel part (110), second tunnel part (120), and third tunnel part (130) in sequence from one side and can be moved so that the above-mentioned second tunnel part (120) and third tunnel part (130) are placed in contact and connected to each other based on the above-mentioned first tunnel part (110), and it includes a first rope (210) with its one end coupled with the above-mentioned first tunnel part (110) and its other end coupled with the above-mentioned third tunnel part (130), a first pulley (220) that is fixedly coupled to the above-mentioned second tunnel part (120) so that the above-mentioned first rope (210) can be wound at a position that is separated in the expanding direction of the tunnel length from the other end of the above-mentioned first rope (210) and interlocked and moved in accordance with the moving displacement of the other end of the above-mentioned first rope (210), a second rope (230) that is installed separately from the above-mentioned first rope (210) and in which its one end is coupled with the above-mentioned first tunnel part (110) and its other end is coupled with the above-mentioned third tunnel part (130), and a second pulley (240) that is fixedly coupled to the above-mentioned second tunnel part (120) so that the above-mentioned second rope (210) can be wound at a position that is separated in the contracting direction of the tunnel length from one end of the above-mentioned second rope (230) and is interlocked and moved in accordance with the moving displacement of the other end of the above-mentioned second rope (230).

Here, the above-mentioned first rope (210) and second rope (230) preferably include rope members (211) that extend and are formed so that their terminal parts penetrate through through-holes formed in rope supports (251) installed on bottom plates (111, 131) of the above-mentioned first tunnel part and third tunnel part so that both ends of the above-mentioned first rope (210) and second rope (230) are locked to regular positions of the above-mentioned first tunnel part (110) and third tunnel part (130), and spring members (212) that are coupled with the above-mentioned rope members (211) so that the terminal parts of the above-mentioned rope members (211) that penetrate through the above-mentioned rope supports (251) are elastically pressurized in the direction opposite extending direction of the above-mentioned rope members (211). Then, in the above-mentioned first tunnel part (110), second tunnel part (120), and third tunnel part (130), the above-mentioned second tunnel part (120) and third tunnel part (130) are preferably interlocked and moved in a state in which a bottom plate (121) of the above-mentioned second tunnel part is opposite the lower side of the bottom plate (111) of the above-mentioned first tunnel part and the bottom plate (131) of the above-mentioned third tunnel part is opposite the lower side of the bottom plate (121) of the above-mentioned second tunnel part.

Also, one end of the above-mentioned first rope (210) is preferably coupled to the rope support (251) that extends downward from the lower part of the bottom plate (111) of the above-mentioned first tunnel part to a position that is horizontal with respect to the bottom plate (131) of the above-mentioned third tunnel part, and the other end is preferably coupled with the upper part of the bottom plate (131) of the above-mentioned third tunnel part at a position that is horizontal with respect to the above-mentioned one end.

Then, the above-mentioned first pulley (220) is preferably fixedly installed between the bottom plate (121) of the above-mentioned second tunnel part and the bottom plate (131) of the third tunnel part so that it has a rotational pattern in a direction perpendicular to the moving direction of the above-mentioned second tunnel part (120) and third tunnel part (130).

Also, the above-mentioned first pulley (220) preferably includes a bearing base (221) that forms a circumferential protruded part at the lower part of the bottom plate (121) of the above-mentioned second tunnel part and is fixedly coupled, a bearing (222) that is coupled with the outer peripheral part of the above-mentioned bearing base (221), a roller (223) that is equipped with a connecting surface capable of rotating in the extending direction of the above-mentioned first rope (210) and is coupled to the outer periphery of the above-mentioned bearing (222), and a bearing cover (224) for fastening and fixing the above-mentioned bearing (222) onto the above-mentioned bearing base (221).

Then, one end of the above-mentioned second rope (230) is preferably coupled with the lower part of the bottom plate (111) of the above-mentioned first tunnel part, and the other end is preferably coupled with the upper part of the bottom plate (131) of the above-mentioned third tunnel part at a height different from that of the above-mentioned one end.

Also, it is preferable for the above-mentioned second pulley (240) to have a rotational shaft tilted from the direction perpendicular to the moving direction of the above-mentioned second tunnel part (120) and third tunnel part (130) between the bottom plate (111) of the above-mentioned first tunnel part and the bottom plate (131) of the third tunnel part so that the contact with one end of the above-mentioned second rope (230) and the contact with the other end of the above-mentioned second rope (230) are at different heights.

Then, the above-mentioned second pulley (240) preferably includes a bearing base (241) that is coupled in a tilted state from the direction perpendicular to the moving direction of the above-mentioned second tunnel part (120) and third tunnel part (130) on a rotational shaft fixer (252) that forms a pair of separated protruded parts between the bottom plate (111) of the above-mentioned first tunnel part and the bottom plate (131) of the third tunnel part and is fixedly coupled, a bearing (242) that is coupled with the outer peripheral part of the above-mentioned bearing base (241); and a roller (243) that is equipped with a connecting surface capable of rotating in the extending direction of the above-mentioned second rope (230) and is coupled with the outer peripheral part of the above-mentioned bearing (242).

Also, a rope holder (253) that is equipped with a rope holding surface for holding up the above-mentioned first rope or second rope from the lower side and installed in the first pulley or second pulley; and a rope guide (260) that is installed on the extension path of the above-mentioned first rope (210) or second rope (230) so that the first rope (210) or second rope (230) is guided in a specific direction are preferably further provided.

According to the present invention with the above-mentioned constitution, as its operational structure, if the third tunnel part moves to the first tunnel part, the second tunnel part can be naturally interlocked with it and moved to the first tunnel part by the first rope and the first pulley, and if the third tunnel part moves in the direction of separation from the first tunnel part, the second tunnel part can be interlocked with it and moved by the second rope and the second pulley.

Thus, since the second tunnel part and the third tunnel part can be smoothly moved while their connection state can be always constantly maintained by the first rope, the first pulley, the second rope, and the second pulley, noise generation due to a forced connection and collision and a life decrease in the apparatus due to impact can be prevented.

Also, the second tunnel part can be moved by a pressure corresponding to only half the force required for directly pushing and moving the second tunnel part. If the third tunnel part is moved by 2x, since the second tunnel part is automatically interlocked with it and moved by x, the load imposed on the lift column and the driving gear for transmitting a driving force to the third terminal part is reduced to one half, and the second tunnel part and the third tunnel part can be moved more rapidly.

Then, compared with a conventional apparatus having a complicated structure that is sized to stably transmit pressure to the second tunnel part and is equipped with separate multiple hooks that can be protruded and returned, this small apparatus that can be stably installed in a separate space and a marginal space within the first tunnel part, the second tunnel part and the third tunnel part can be realized by a simple structure consisting of the first rope, the first pulley, the second rope, and the second pulley.

Also, with a structure in which the second pulley is fixedly installed in a tilted state, one side and the other side of the second rope can be extended and installed at different heights, even though multiple pulleys or roller members are not equipped, and the second rope can be efficiently installed in terms of space, with a diameter that is not excessively small, by utilizing a separation space between the first tunnel part and the third tunnel part.

An exemplary cable tray for a boarding bridge can be realized by means of a simple structure while allowing connection cables running to multiple tunnel parts to maintain independent wiring states precluding entanglement with each other, when applied to a boarding bridge equipped with a tunnel having three sections that can contact and connect with each other.

One example cable tray is installed on a boarding bridge equipped with a tunnel consisting of a first tunnel part, a second tunnel part, and a third tunnel part that can contact and connect with each other. The cable tray includes a first tray part installed along the longitudinal direction of the first tunnel part at the bottom of the first tunnel parts. A second tray part is installed along the longitudinal direction of the second tunnel part at the bottom of the second tunnel part that slides and moves in a state in which one end is secured to the first tray part. A third tray part is installed along the longitudinal direction of the third tunnel part at the bottom of the third tunnel part that slides and moves in a state in which one end is secured to the second tray part. A first connection cable is bent relative to the first tunnel part, wherein one end is coupled to the first tray part, and its other end is coupled to the second tunnel part. A second connection cable is bent relative to the third tunnel part, wherein one end is coupled to the first tray part, and its other end is coupled to the third tunnel part at a position where the cable is separated from one end of the first connection cable in the direction of the third tunnel part.

In one such example, the first connection cable and second connection cables have one and the other of their ends respectively coupled via hinges to the first tray part and second tunnel part and the first tray part and third tunnel part.

Also, a first guide roller is installed between the first tray part and second tray part so that the sliding movement between the first tray part and second tray part is guided by a rolling motion. A second guide roller is installed between the second tray part and third tray part so that the sliding movement between the second tray part and third tray part is guided by a rolling motion, are preferably included.

It is also possible for the first guide roller, second guide roller or both to include a horizontal axis roller that rolls in a state in which it is in contact at top and bottom with the first tray part and second tray part or the second tray part and third tray part. A vertical axis roller rolls in a state in which it is in contact at the left and right with the first tray part and second tray part or the second tray part and third tray part.

According to the present invention with the above-mentioned constitution, when this cable tray is applied to a boarding bridge equipped with a tunnel having three sections that can contact and connect with each other, multiple connection cables for supplying a power to multiple movable tunnel parts are coupled with the tray parts at separated positions and are installed such that they are bent in directions opposite from each other. Thus, even if the multiple movable tunnel parts are simultaneously and repeatedly moved in reciprocating fashion, since the connection cables maintain a separated state, stable wiring can always be maintained without entanglements.

Also, since stable branch wiring can be realized by means of a simple structure in which the coupling positions and the bending directions of the connection cables are different in one wiring path formed by multiple tray parts, multiple independent wiring paths for supplying power to each tunnel part do not need to be provided, so that the cable tray volume and load are minimized. Manufacture and installation of the cable tray can thereby be facilitated, and maintenance and control can also be easily realized during use.

The various features and advantages of this invention will become apparent to those skilled in the art from the following detailed description. The drawings that accompany the detailed description can be briefly described as follows.

DETAILED DESCRIPTION

Figure 1:
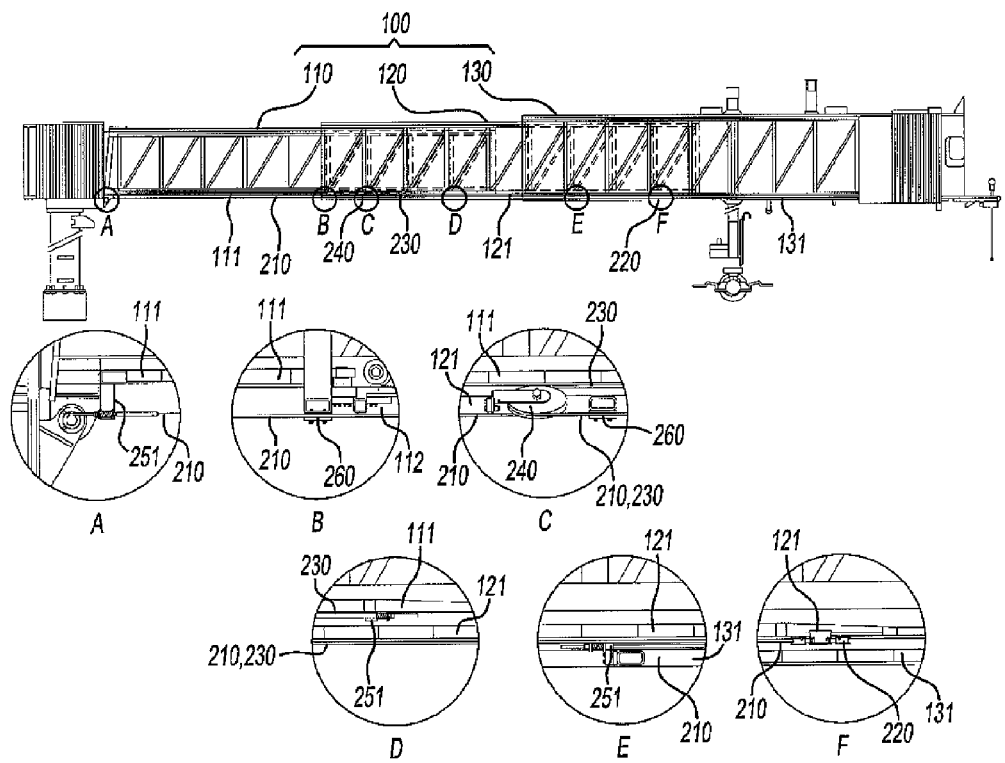
FIG. 1 is a perspective 1 is a perspective front view showing the main parts in a state in which a first application example of the apparatus for moving a tunnel part of a boarding bridge of the present invention is installed in a tunnel.
Figure 2:
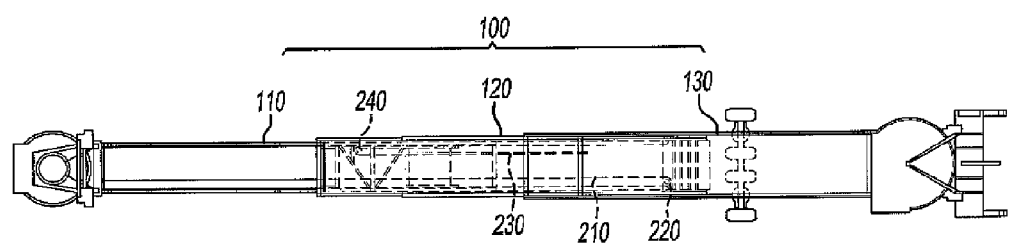
FIG. 2 is a perspective plan view showing the main parts of FIG. 1.
Figure 3:
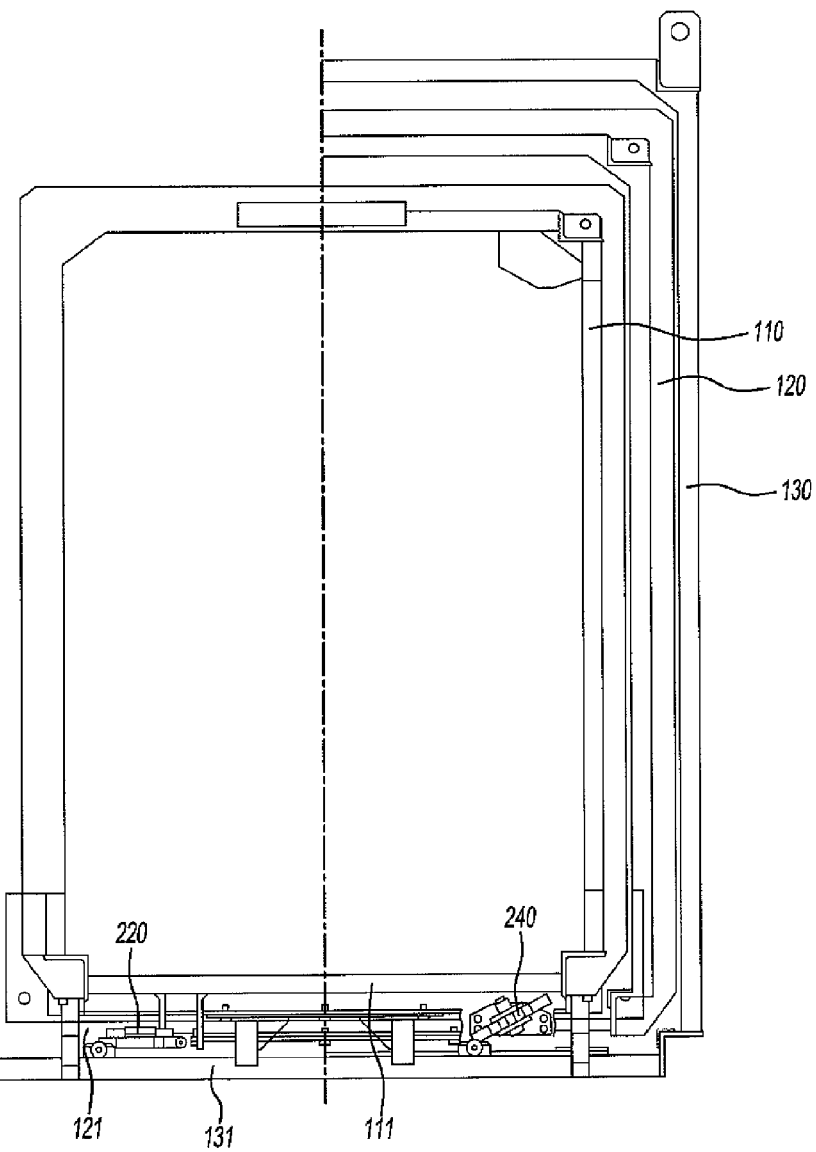
FIG. 3 is a perspective cross section showing the main parts of line Z-Z of FIG. 1.

The apparatus for moving a tunnel part of a boarding bridge of the present invention, as shown in FIGS. 1-3, is a tunnel part moving apparatus that is mounted in a boarding bridge equipped with a tunnel (100) that consists of first tunnel part (110), second tunnel part (120), and third tunnel part (130) and can be interlocked and moved so that the above-mentioned second tunnel part (120) and third tunnel part (130) are placed in contact and connected to each other based on the above-mentioned first tunnel part (110). This apparatus has a structure constituted mainly by first rope (210), first pulley (220), second rope (230), and second pulley (240).

The above-mentioned first rope (210) and first pulley (220) are constitutional elements that are installed on the above-mentioned first, second, and third tunnel parts (110, 120, 130) so that when the above-mentioned third tunnel part (130) is moved to the above-mentioned first tunnel part (110), the above-mentioned second tunnel part (120) is interlocked with it and moved. The ends of the above-mentioned first rope (210) are respectively coupled with the above-mentioned first tunnel part (110) and third tunnel part (130), and the above-mentioned first pulley (220) is fixedly coupled to the above-mentioned second tunnel part (120) by hooking the above-mentioned first rope (210) at a position that is separated in the direction in which the second and third tunnel parts (120, 130) are moved to expand the length of the above-mentioned tunnel (300), from the other end of the above-mentioned first rope (210).

The above-mentioned second rope (230) and second pulley (240) are constitutional elements that are installed on the above-mentioned first, second, and third tunnel parts (110, 120, 130) so that when the above-mentioned third tunnel part (130) is moved in the direction of separation from the above-mentioned first tunnel (110), the above-mentioned second tunnel part (120) is interlocked with it and is moved. Similar to the above-mentioned first rope (210), one end and the other end of the above-mentioned second rope (230) are respectively coupled with the above-mentioned first tunnel part (110) and third tunnel part (130), and the second pulley (240) is fixedly coupled to the above-mentioned second tunnel part (120) by hooking the above-mentioned second rope (210) at a separated position in the direction in which the above-mentioned second and third tunnel parts (120, 130) are removed to reduce the length of the above-mentioned tunnel (300) from one end of the above-mentioned second rope (230).

Figure 4:
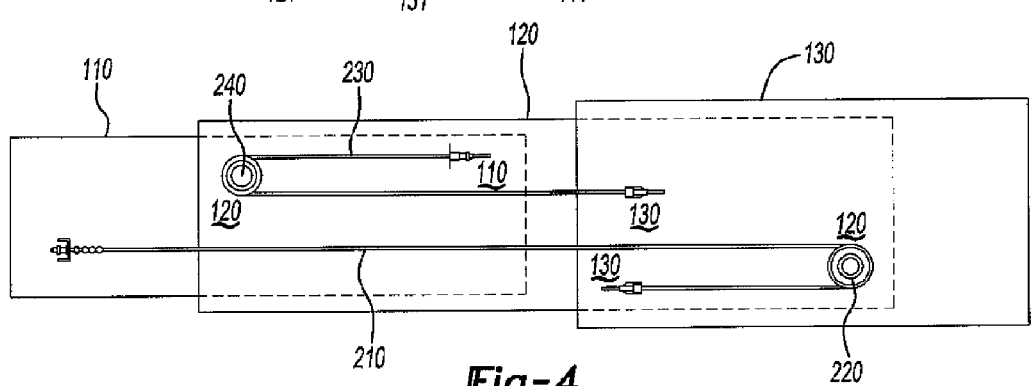
FIG. 4 is a schematic diagram showing a state in which the apparatus for moving a tunnel part of a boarding bridge of the present invention is installed in a tunnel.
Figure 5:
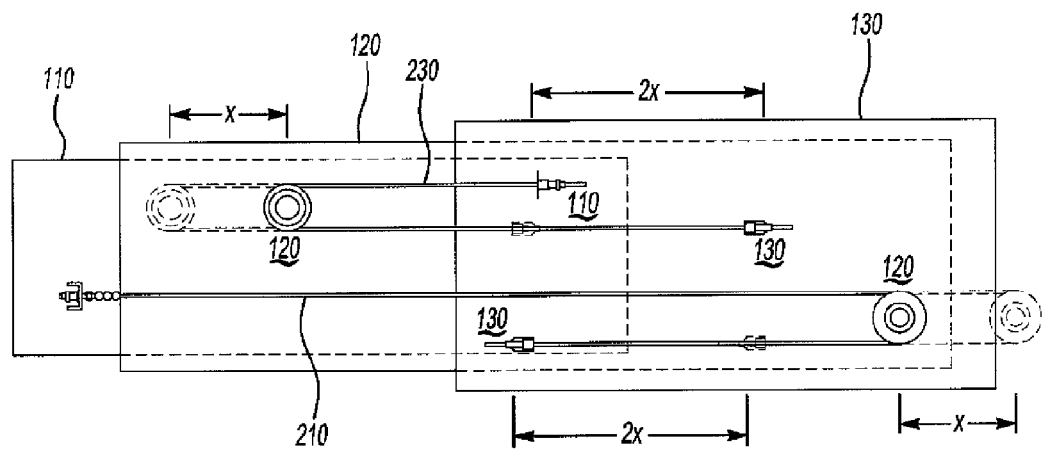
FIG. 5 is a schematic diagram showing the operational principle in which a third tunnel part and a second tunnel part are interlocked and moved in FIG. 4.

In a state shown in FIG. 4, if the above-mentioned third tunnel part (130), as shown in FIG. 5, moves to the free end of the above-mentioned first tunnel part (110) by 2x, the other end of the above-mentioned first rope (210) is pulled to the free end of the above-mentioned tunnel part (110) along with the above-mentioned third tunnel part (130) by 2x, and one end of the above-mentioned first rope (210) maintains a fixed state at a regular position along with the above-mentioned first tunnel part (110), so that the above-mentioned first pulley (220) is interlocked and moved to the free end of the above-mentioned first tunnel part (110) along with the above-mentioned second tunnel part (120) by x.

In the state shown in FIG. 5, if the above-mentioned third tunnel part (130) moves in the opposite direction by 2x to return to the original position as shown in FIG. 4, the other end of the above-mentioned second rope (230) is pulled and moved along with the above-mentioned third tunnel part (130) by 2x, and one end of the second rope (230) maintains a fixed state at a regular position along with the above-mentioned first tunnel part (110), so that the above-mentioned second pulley (240) is interlocked and moved to the free end of the above-mentioned third tunnel part (130) along with the above-mentioned second tunnel part (120) by x.

Next, the constitutional elements that are installed on bottom plates (111, 113) of the above-mentioned first tunnel part and third tunnel part to lock both ends of the above-mentioned first rope (210) and second rope (230) at regular positions on the above-mentioned first tunnel part (110) and third tunnel part (130) are called rope supports (251), and the constitutional element that forms a pair of separated protruded parts and is fixedly coupled to lock the above-mentioned first pulley (220) or second pulley (240) at a regular position between the bottom plate (111) of the above-mentioned first tunnel part and the bottom plate (131) of the third tunnel part is called a rotational shaft fixer (252).

The above-mentioned first rope (210) and second rope (230) respectively consist of a rope member (211) and a spring member (212). The above-mentioned rope member (211) extends and is formed in a rope shape from the above-mentioned first tunnel part (110) to the above-mentioned third tunnel part (130), and its terminal part penetrates through a through-hole (251a) formed in the above-mentioned rope support (251). The above-mentioned spring member (212) is coupled with the above-mentioned rope member (211) to elastically press the terminal part of the above-mentioned rope member (211) that penetrates through the above-mentioned rope support (251) in the direction opposite the extending direction of the above-mentioned rope member (211).

As mentioned above, if the above-mentioned spring member (212) elastically presses the terminal part of the above-mentioned rope member (211) in the direction opposite the extending direction of the above-mentioned rope member (211), the other ends of the first rope (210) and the second rope (230) gradually receive a moving displacement and pressure of the above-mentioned third tunnel part (130) through the above-mentioned rope support (251) while the above-mentioned spring members (212) are compressed to the maximum compression displacement.

Then, one end of the above-mentioned first rope (210) and second rope (230) fastened to the rope support (251) installed in the above-mentioned first tunnel part (110) gradually receives pressure that is pulled to the above-mentioned first pulley (220) and second pulley (240) while the above-mentioned spring member (212) is compressed to the maximum compression displacement, so that transmission of an instantaneous excessive pressure to the above-mentioned rope members (211) and rope support (251) by the movement of the above-mentioned third tunnel part (130) is prevented.

If the above-mentioned first tunnel part (110), second tunnel part (120), and third tunnel part (130) have a structure in which the bottom plate (121) of the above-mentioned second tunnel part is opposite the lower side of the bottom plate (111) of the above-mentioned first tunnel part and the bottom plate (131) of the above-mentioned third tunnel part is opposite the lower side of the bottom plate (121) of the above-mentioned second tunnel part, the above-mentioned first rope (210), first pulley (220), second rope (230), and second pulley (240) will be preferably installed by maximally utilizing a separation space and a marginal space that are formed among the bottom plates (111, 121, 131) of the above-mentioned multiple tunnel parts.

With the installation of the separation space and the marginal space that are formed among the bottom plates (111, 121, 131) of the above-mentioned multiple tunnel parts, one end and the other end of both the above-mentioned first rope (210) and second rope (230) are respectively installed on the bottom plate (111) of the above-mentioned first tunnel part and the bottom plate (131) of the third tunnel part. However, they are installed on the bottom plate (121) of the above-mentioned second tunnel part at the positions where the above-mentioned first pulley (220) and second pulley (240) are respectively adjacent to the above-mentioned third tunnel part (130) and the above-mentioned first tunnel part (110).

Therefore, although one end of the above-mentioned first rope (210) can be installed in accordance with the height of the other end by utilizing the marginal space, which is formed at the lower side of the bottom plate (111) of the above-mentioned first tunnel part in a part in which it does not contact or connect to the above-mentioned second tunnel part (120) and third tunnel part (130), one end of the above-mentioned second rope (230) is unavoidably positioned in the separation space that is formed between the bottom plate (111) of the above-mentioned first tunnel part and the bottom plate (121) of the second tunnel part, and the other end of the above-mentioned second rope (230) is unavoidably installed on the bottom plate (131) of the above-mentioned third tunnel part at the lower side of the bottom plate (121) of the above-mentioned second tunnel part.

Next, the installation structure through the utilization of the separation space and the marginal space that are formed among the bottom plates (111, 121, 131) of the above-mentioned multiple tunnel parts within the above-mentioned spatial limitation will be explained in further detail.

Figure 6:
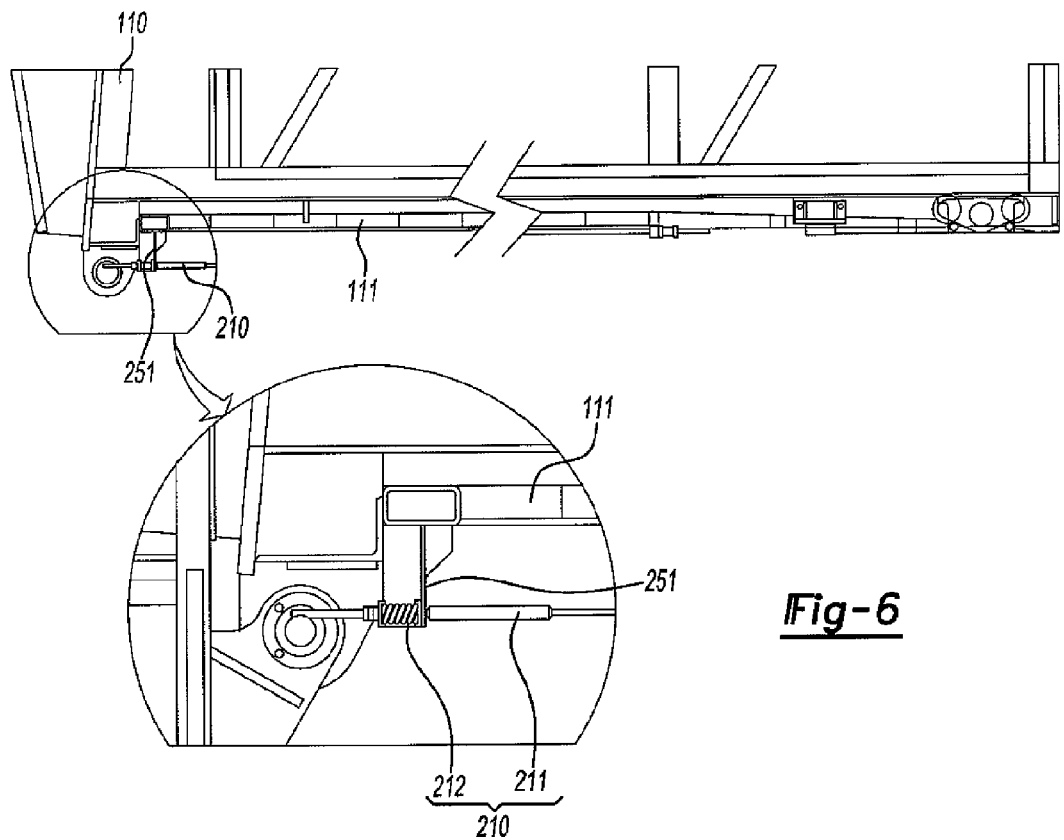
FIG. 6 is a front view showing the main parts in an installed state on a first tunnel part.
Figure 7:
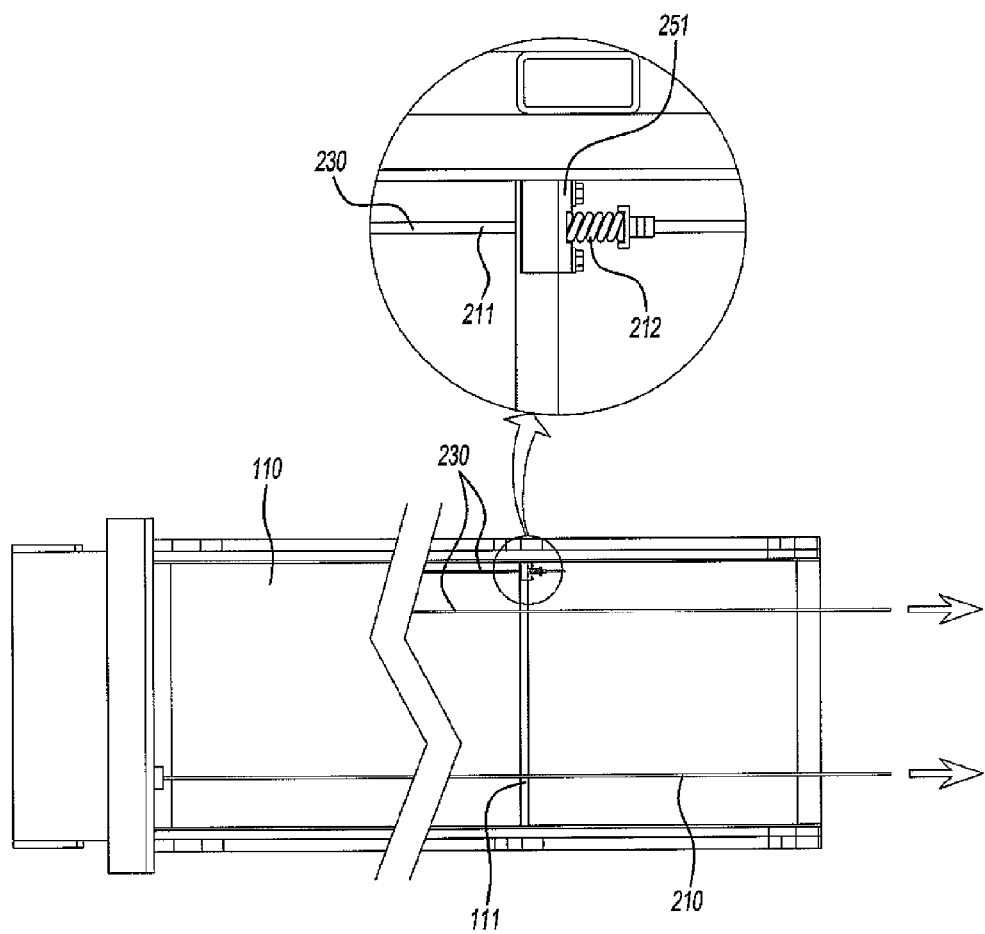
FIG. 7 is a plan view showing the main parts of FIG. 6.
Figure 8:
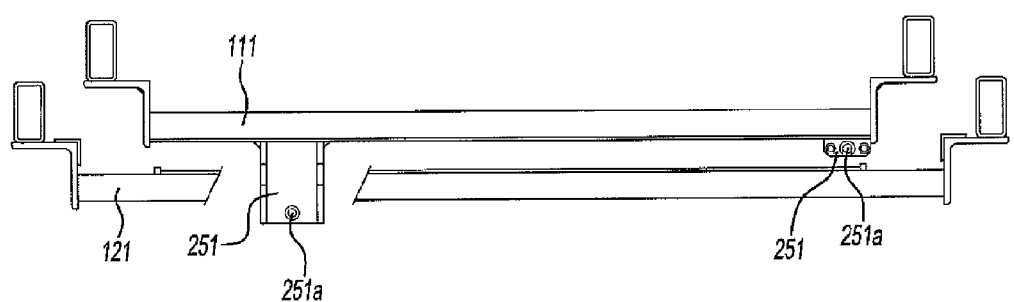
FIG. 8 is a side view showing the main parts of FIG. 6.
Figure 9:
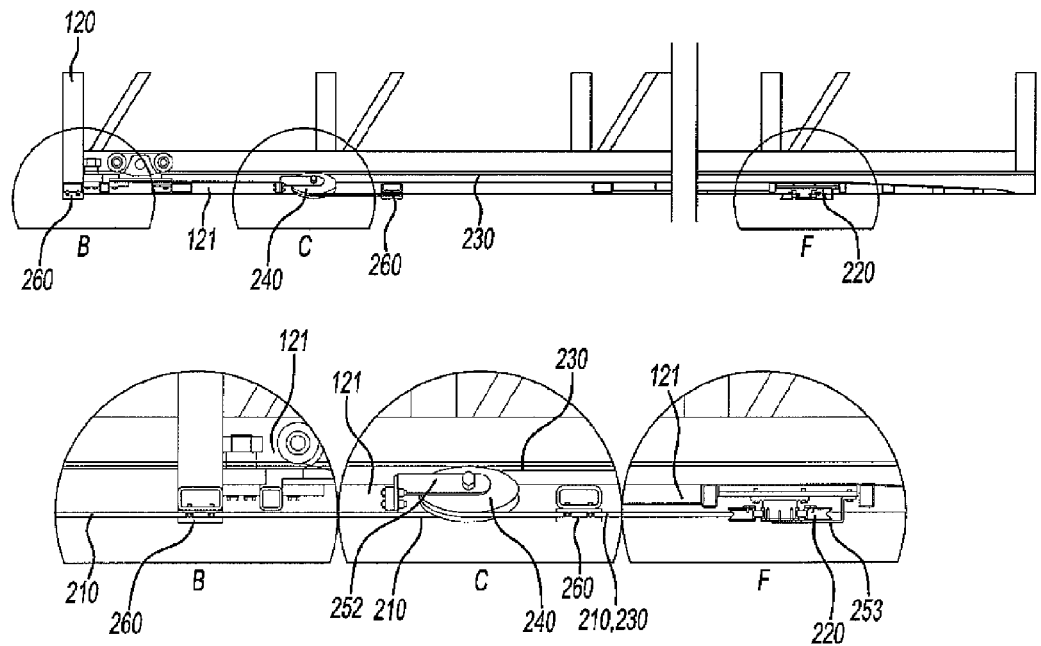
FIG. 9 is a front view showing the main parts in an installed state on the second tunnel part.
Figure 10:
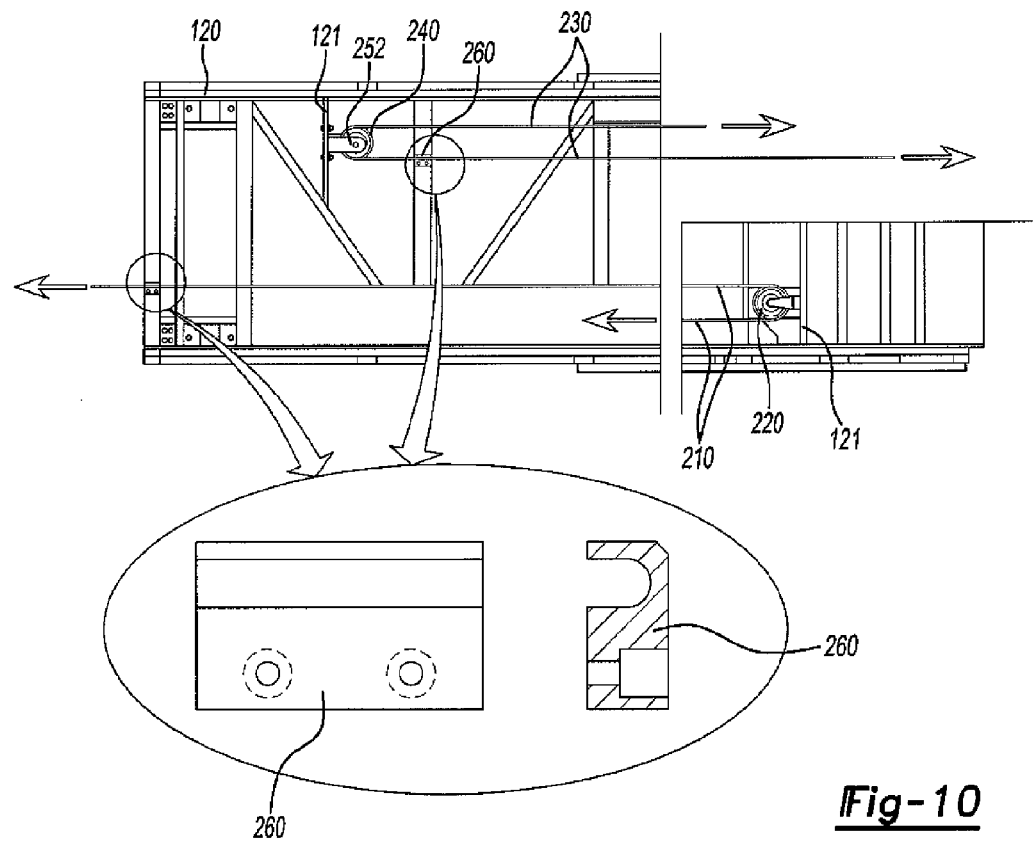
FIG. 10 is a plan view showing the main parts of FIG. 9.
Figure 11:
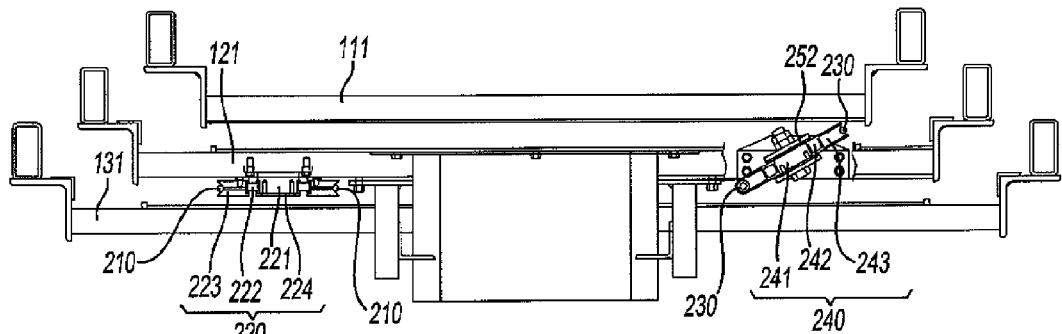
FIG. 11 is a side view showing the main parts of FIG. 9.

One end of the above-mentioned first rope (210), as shown in FIGS. 6-8, is coupled to the rope support (251) that extends downward to a position horizontal to the bottom plate (131) of the above-mentioned third tunnel part at the lower part of the above-mentioned first tunnel part, and the other end is coupled with the upper part of the bottom plate (131) of the above-mentioned third tunnel part at a position that is horizontal with respect to the above-mentioned one end. The above-mentioned first pulley (220), as shown in FIGS. 9-11, is fixedly installed between the bottom plate (121) of the above-mentioned second tunnel part and the bottom plate (131) of the third tunnel part so that it has a rotational axis in a direction perpendicular to the moving direction of the above-mentioned second tunnel part (120) and third tunnel part (130).

In the above-mentioned first application example, the above-mentioned first pulley (220) has a structure consisting of bearing base (221), bearing (222), roller (223), and bearing cover (224). The above-mentioned bearing base (221) forms a circumferential protruded part at the lower part of the bottom plate (121) of the above-mentioned second tunnel part and is fixedly coupled, and the above-mentioned bearing (222) is coupled with the outer peripheral part of the above-mentioned bearing base (221). The above-mentioned roller (223) is equipped with a connecting surface that can rotate in the extending direction of the above-mentioned first rope (210) and is coupled to the outer periphery of the above-mentioned bearing (222), and the above-mentioned bearing cover (224) fastens and fixes the above-mentioned bearing (222) to the above-mentioned bearing base (221).

Figure 12:
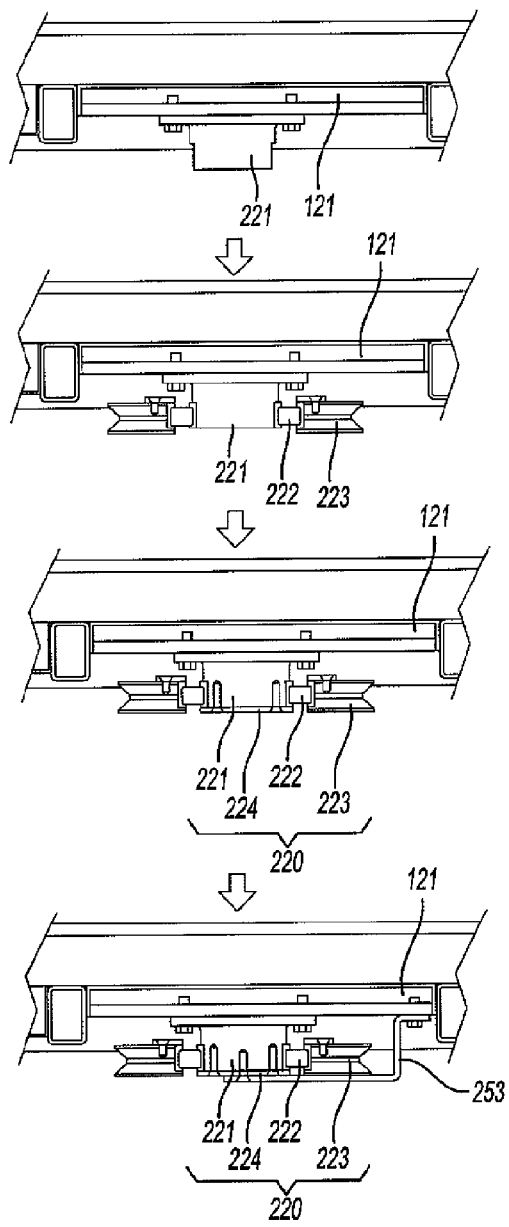
FIG. 12 are front views showing an installation process of a first pulley.

In installing the first pulley (220) with the above-mentioned structure on the bottom plate (121) of the above-mentioned second tunnel part, as shown in FIG. 12, the above-mentioned bearing base (221) is fixedly installed at the lower part of the bottom plate (121) of the above-mentioned second tunnel part, the bearing (222) in an assembled state with the above-mentioned roller (223) is inserted onto the above-mentioned bearing base (221) from the lower side, and the above-mentioned bearing cover (224) is fixed to the above-mentioned bearing base (221) so that it supports the lower end of the above-mentioned bearing (222).

Then, a rope holder (253) equipped with a rope holding surface that can hold up the above-mentioned first rope (210) from the lower side is preferably installed between the above-mentioned second tunnel part (120) and third tunnel part (130) to be able to prevent separation of the above-mentioned first rope (210) from the connection path and the extension path with the above-mentioned first pulley (220) and its inability to completely return, even if the state in which the above-mentioned first rope (210) is airtightly connected to the above-mentioned first pulley (220) cannot be maintained.

One end of the above-mentioned second rope (230), as shown in FIGS. 6-8, is coupled with the lower part of the bottom plate (111) of the above-mentioned first tunnel part, and the other end is coupled with the upper part of the bottom plate (131) of the above-mentioned third tunnel part at a height different from that of the above-mentioned one end. The above-mentioned second pulley (240), as shown in FIGS. 9-11, is fixedly installed with a rotational axis tilted from a direction perpendicular to the moving direction of the above-mentioned second tunnel part (120) and third tunnel part (130) between the bottom plate (111) of the above-mentioned first tunnel part and the bottom plate (131) of the third tunnel part so that the contact with one end of the above-mentioned second rope (230) and the contact with the other end of the above-mentioned second rope (230) are at different heights.

Figure 13:
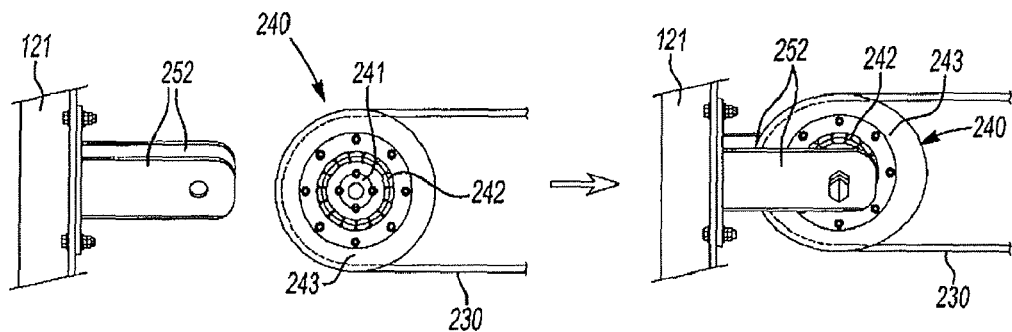
FIG. 13 are plan views showing an installation process of a second pulley.
Figure 14:
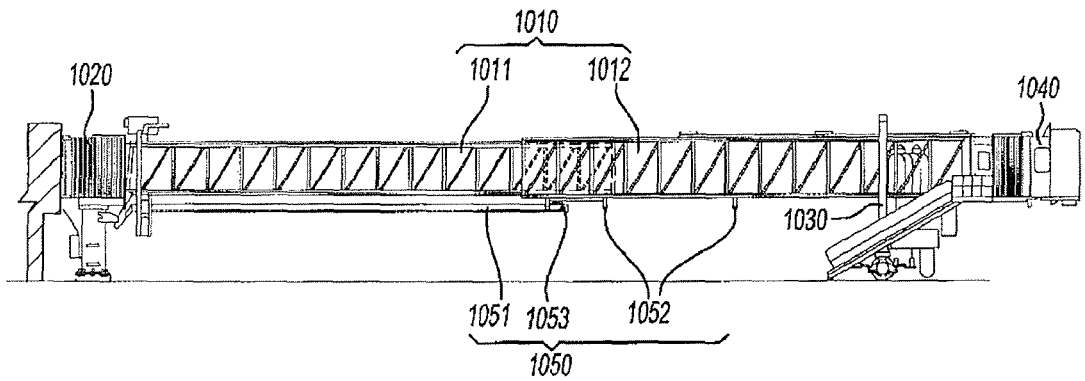
FIG. 14 is a front view showing a general boarding bridge.
Figure 15:
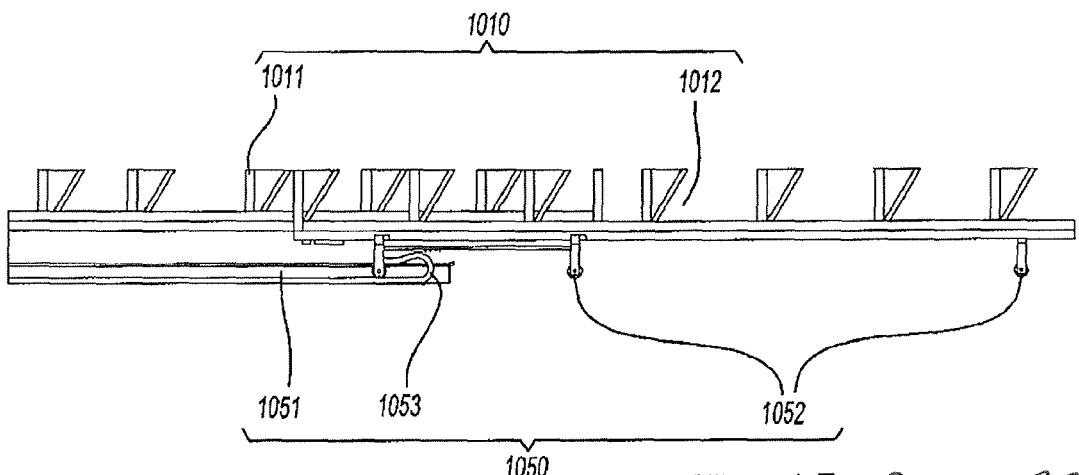
FIG. 15 is a front view showing the main part of a cable tray for a boarding bridge of the prior art.

In the above-mentioned first application example, the above-mentioned second pulley (240) has a structure consisting of bearing base (241), bearing (242), and roller (243). The above-mentioned bearing base (241) is coupled in a tilted state from a direction perpendicular to the moving direction of the above-mentioned second tunnel part (120) and third tunnel part (130) to the above-mentioned rotational shaft fixer (252), the above-mentioned bearing (242) is coupled with the outer peripheral part of the above-mentioned bearing base (241), and the above-mentioned roller (243) is equipped with a connecting surface capable of rotating in the extending direction of the above-mentioned second rope (230) and is coupled with the outer peripheral part of the above-mentioned bearing (242). In installing the second pulley (240) with the above-mentioned structure between the bottom plate (111) of the above-mentioned first tunnel part and the bottom plate (131) of the third tunnel part, as shown in FIG. 13, the above-mentioned rotational shaft fixer (252) is fixedly installed on the bottom plate (121) of the above-mentioned second tunnel part, and the above-mentioned bearing base (241) is tilted at a designated angle and fixed onto the above-mentioned rotational shaft fixer (252) in a state in which the above-mentioned bearing (242), roller (243), and second rope (230) are assembled.

With the structure in which the above-mentioned second pulley (240) is fixedly installed in a tilted state, the two sides of the above-mentioned second rope (230) can be extended and installed at different heights, even without being equipped with multiple pulleys or roller members, and the above-mentioned second rope (230) can be efficiently installed in terms of space with a diameter of 250 mm or greater, which does not lead to excessive bending of the rope, by utilizing the separation space between the above-mentioned first tunnel part (110) and third tunnel part (130).

On the extension path of the above-mentioned first rope (210) or second rope (230), as shown in FIGS. 9-11, a rope guide (260) equipped with a recess or through-hole capable of guiding the above-mentioned first rope (210) or second rope (230) in a specific direction is preferably installed so that the above-mentioned first rope (210) and second rope (230) can be guided at different heights in different directions without excessive bending, while connecting and supporting the above-mentioned first rope (210) and second rope (230) at several positions other than the positions corresponding to the above-mentioned rope support (251) and the above-mentioned first pulley (220) and second pulley (240).

According to the apparatus for moving a tunnel part of a boarding bridge of the present invention, if the above-mentioned third tunnel part (130) moves to the above-mentioned first tunnel part (110), the above-mentioned second tunnel part (120) is naturally interlocked with it and is moved to the above-mentioned first tunnel part (110) by the above-mentioned first rope (210) and first pulley (220), and if the above-mentioned third tunnel part (130) moves in the direction of separation from the above-mentioned first tunnel part (110), the above-mentioned second tunnel part (120) is interlocked with it and is moved by the above-mentioned second rope (230) and second pulley (240).

Therefore, while the connection state between the above-mentioned second tunnel part (120) and third tunnel part (130) is not changed but is always constantly maintained by the above-mentioned first rope (210), first pulley (220), second rope (230), and second pulley (240), the above-mentioned second tunnel part (120) and third tunnel part (130) can be smoothly moved, so the phenomenon in which noise is generated by forced connection and collision in a conventional structure utilizing hooks and the like decrease of the apparatus due to impact can be prevented.

Also, both sides of the above-mentioned first rope (210) and second rope (230) distribute and support the force based on the above-mentioned first pulley (220) and second pulley (240), so that the above-mentioned second tunnel part (120) can be moved by a pressure corresponding to only one half of the force required for pushing and moving the above-mentioned second tunnel part (120) by direct pressurization. If the above-mentioned third tunnel part (130) is moved by 2x, since the above-mentioned second channel part (120) can be automatically interlocked with it and moved by x, the above-mentioned second channel part (120) and third tunnel part (130) can be more rapidly moved.

Then, compared with a conventional apparatus for moving a tunnel part of a boarding bridge having a size for stably transmitting pressure to the above-mentioned second tunnel part (120) and a complicated structure in which multiple hooks that can be protruded and returned are separately installed, this apparatus can be realized with a small size such that it can be stably installed in the separation space and the marginal space among the above-mentioned first tunnel part (110), second tunnel part (120), and third tunnel part (130) by a simple structure consisting of the above-mentioned first rope (210), first pulley (220), second rope (230), and second pulley (240).

Turning attention now to FIGS. 16-25, an example cable tray (1200) of the present invention is for a boarding bridge equipped with a tunnel (1100) consisting of first tunnel part (1110), second tunnel part (1120), and third tunnel part (1130). The cable tray (1200) is installed at the bottom of the tunnel (1100) to stably supply power to the second tunnel part (1120) and third tunnel part (1130) that are movable relative to the first tunnel part (1110) that maintains a fixed position in the boarding bridge. This cable tray (1200) consists mainly of first tray part (1210), second tray part (1220), third tray part (1230), first connection cable (1240), and second connection cable (1250).

Figure 16:
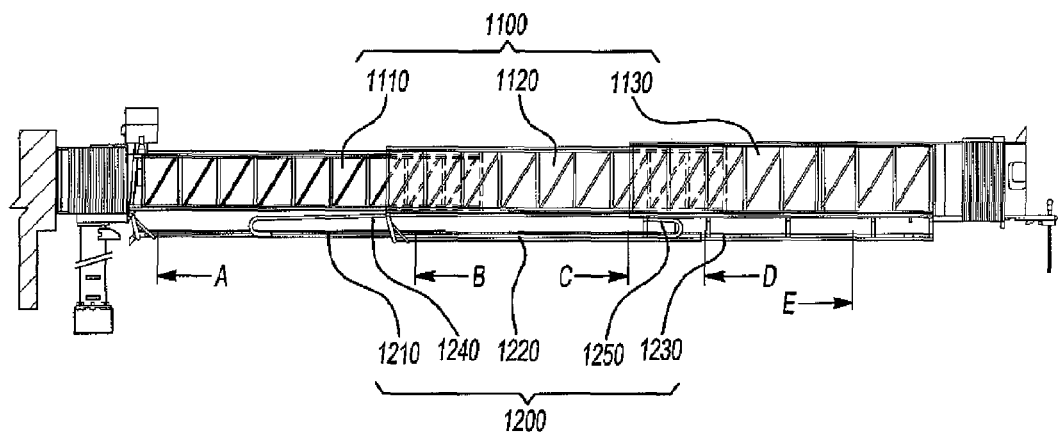
FIG. 16 is a front view showing a state in which the cable tray for a boarding bridge in a first application example of the present invention is installed on a boarding bridge.

The first tray part (1210), second tray part (1220), and third tray part (1230), as shown in FIG. 16, are respectively installed at the bottom of the first tunnel part (1110), second tunnel part (1120), and third tunnel part (1130). The first connection cable (1240) is bent relative to the first tunnel part (1110), and its upper and lower ends are respectively coupled to the second tunnel part (1120) and first tray part (1210). The second connection cable (1250) is bent relative to the third tunnel part (1130), and its upper and lower ends are respectively coupled to the third tunnel part (1130) and first tray part (1210).

Figure 17:
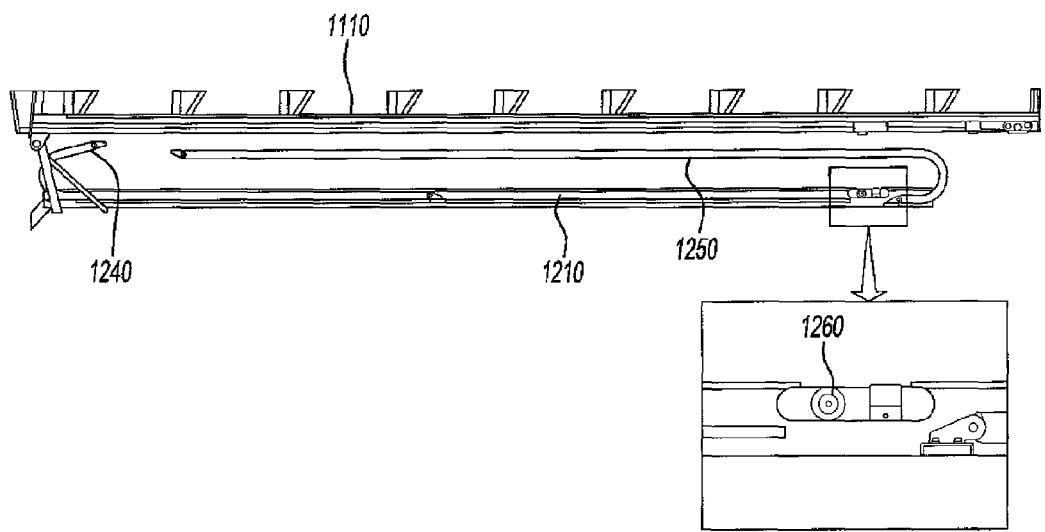
FIG. 17 is a front view showing a first tray part.

The first tray part (1210), as shown in FIG. 17, is provided with a holding surface capable of continuously guiding cables up to the first and second connection cables (1240, 1250) and installed along the longitudinal direction of the first tunnel part (1110) at the bottom of the first tunnel part (1110).

FIG. 16 shows the cable tray of the present invention installed on the tunnel (1100) in a state in which the left ends of the first tunnel part (1110), second tunnel part (1120), and third tunnel part (1130) are separated from each other by the maximum amount, and FIG. 17 shows the first tray part (1210) in a state in which the left ends of the first tunnel part (1110), second tunnel part (1120), and third tunnel part (1130) are in contact and connect adjacently.

Figure 18:
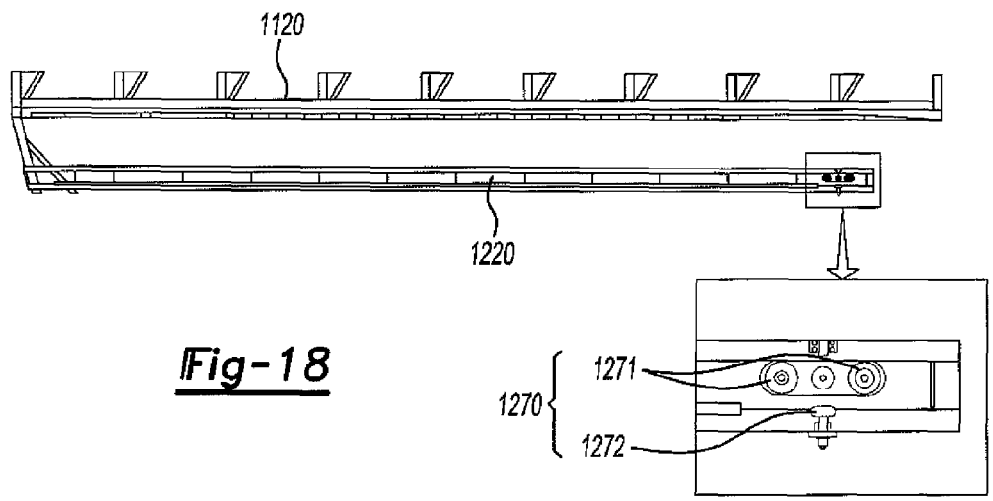
FIG. 18 is a front view showing a second tray part.

The second tray part (1220), as shown in FIG. 18, has a shape corresponding to the first tray part (1210) so that it can be slid and moved with one end secured to the first tray part (1210), is provided with a holding surface capable of continuously guiding the second connection cable (1250) to the third tunnel part (1130), and is installed along the longitudinal direction of the second tunnel part (1120) at the bottom of the second tunnel part (1120).

The third tray part (1230) is installed along the longitudinal direction of the third tunnel part (1130) at the bottom of the of the third tunnel part (1130) so that it can be slid and moved with one end secured to the second tray part (1220), but since it does not need to have a function of guiding cables or connection cables, unlike the first and second tray parts (1210, 1220), a structure capable of stably supporting the other end of the second tray part (1220), without a holding surface for guiding cables or connection cables, is sufficient.

In the first application example of the present invention, one side of the first tray part (1210) is fixed in a regular position on the first tunnel part (1110) by means of a connection support that is installed at the bottom of the first tunnel part (1110) such that it extends downward, one side of the second tray part (1220) is fixed in a regular position on the second tunnel part (1120) by means of a connection support such that it is connected to the bottom of the other side of the first tray part (1210), and the third tray part (1230) is fixedly coupled on the third tunnel part (1130) by multiple connection supports such that it is connected to the lower part of the other end of the second tray part (1220).

Therefore, the two ends of the first tray part (1210) are supported by the connection support installed on the first tunnel part (1110) and the connection support installed on the second tunnel part (1120), the two ends of the second tray part (1220) are supported by the connection support installed on the second support part (1120) and the connection support installed on the third tray part (1230), and the third tray part (1230) is supported at a regular position at the bottom of the tunnel (1100) by multiple connection supports separately installed along the longitudinal direction of the third tunnel part (1130).

The first connection cable (1240) is installed to connect the cable extending along the first tray part (1210) and the cable installed in the second tunnel part (1120). Its lower end is coupled to the first tray part (1210), and its upper end is coupled to the second tunnel part (1120) while being bent relative to the first tunnel part (1110).

The second connection cable (1250) is installed to connect the cable extending along the first tray part (1210) and the cable installed in the third tunnel part (1130). Its lower end is coupled to the first tray part (1210) at a position separated from the lower end of the first connection cable (1240) in the direction of the third tunnel part (1130), and its other end is coupled to the third tunnel part (1130) while being bent relative to the third tunnel part (1130).

Figure 19:
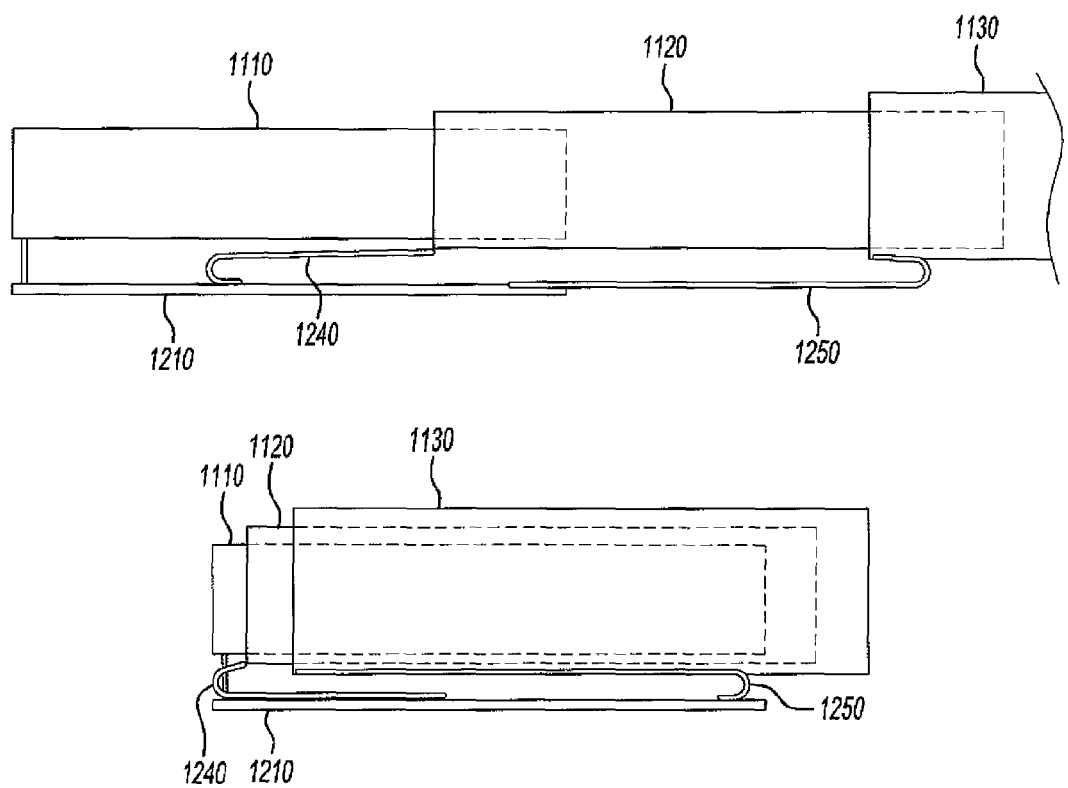
FIG. 19 is a schematic diagram showing the operating principle of the cable tray for a boarding bridge of the present invention.

The first connection cable (1240) and second connection cable (1250), as shown in FIG. 19(*a*), are each respectively bent relative to the first tunnel part (1110) and third tunnel part (1130) in a state in which one of the ends of the first, second, and third tunnel parts (1110, 1120, 1130) is mutually separated from the others, and these connection cables neither overlap nor intersect each other. Even in a state in which the second and third tunnel parts (1120, 1130) are gradually moved to one end of the first tunnel part and one of the ends of the first, second, and third tunnel parts (1110, 1120, 1130) is mutually adjacent to the others as shown in FIG. 19(*b*), these connection cables maintain a state respectively bent relative to the first tunnel part (1110) and third tunnel part (1130) and neither overlap nor intersect each other.

Even if the state shown in FIG. 19(*a*) and the state shown in FIG. 6(*b*) are repeated in an alternating fashion, the first connection cable (1240) and second connection cable (1250) always maintain a state in which they neither overlap nor intersect each other. Preferably, the upper and lower ends of the first and second connection cables (1240, 1250) are coupled with a specific directionality so that their middle parts maintain the bending directions, and are coupled via hinges so that the angle can be flexibly changed within a prescribed angular range where the bending directions are not changed and the cables do not overlap or intersect each other according to the bending positions and the degrees of bending of the middle parts.

Figure 20:
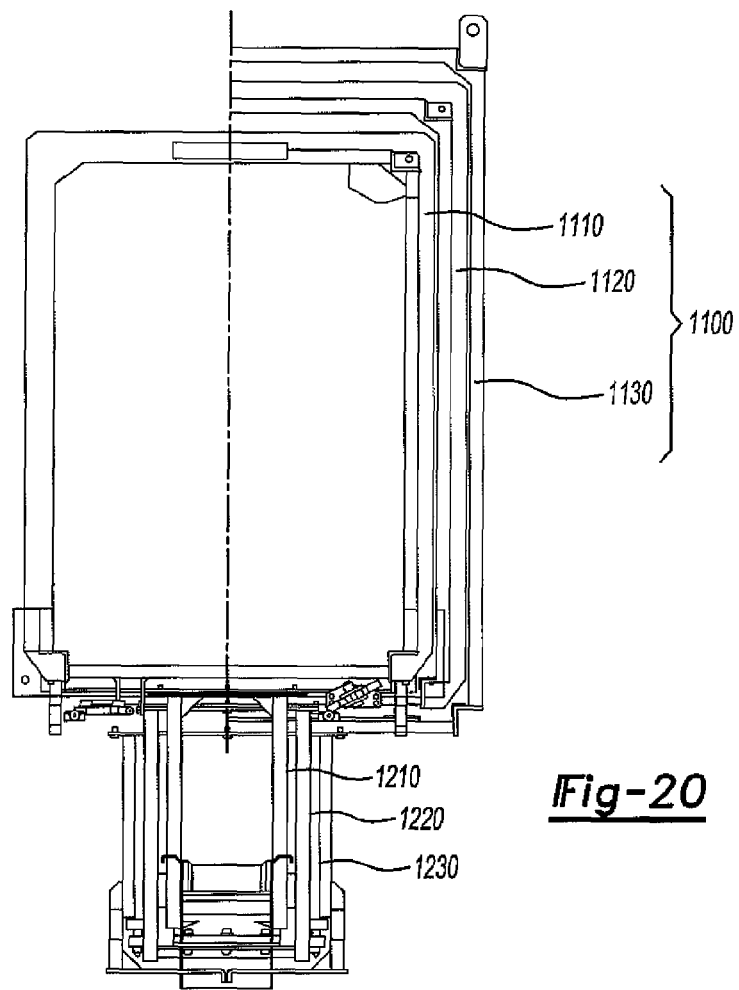
FIG. 20 is an end view of FIG. 16.
Figure 21:
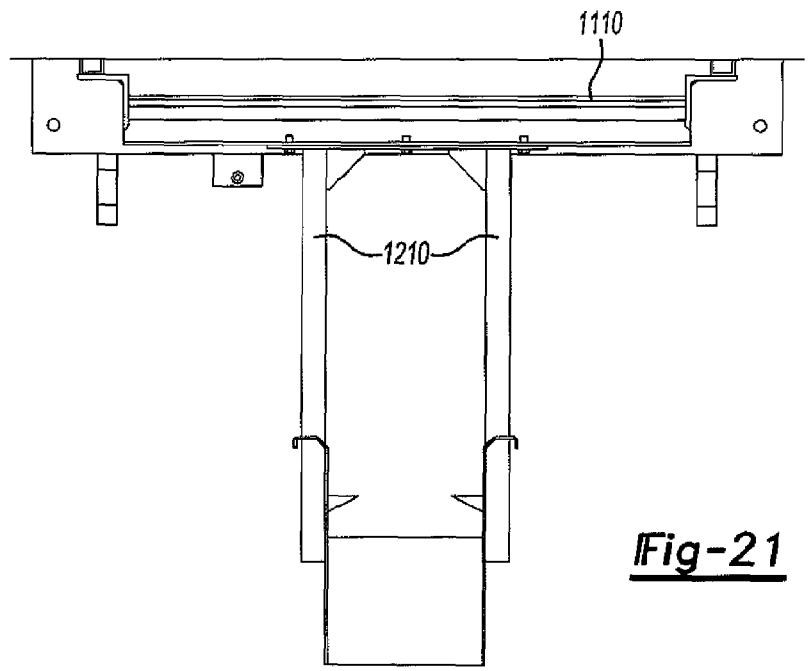
FIG. 21 is a cross section of line A in FIG. 16.
Figure 22:
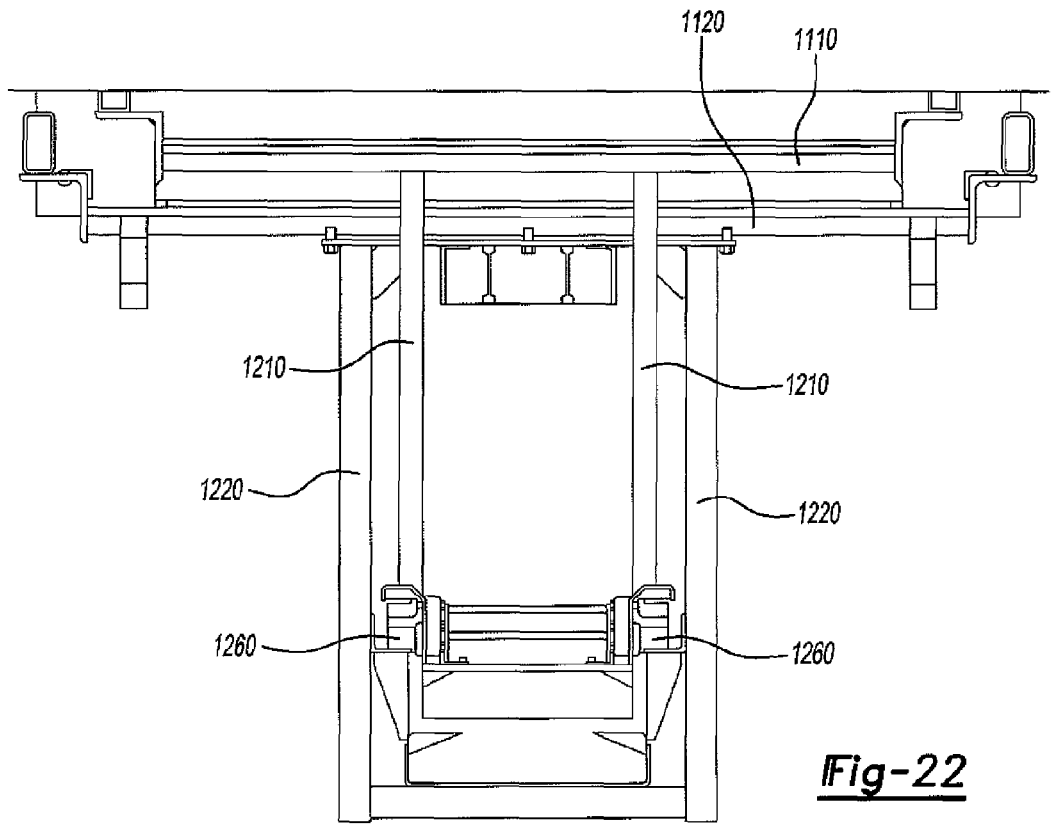
FIG. 22 is a cross section of line B in FIG. 16.
Figure 23:
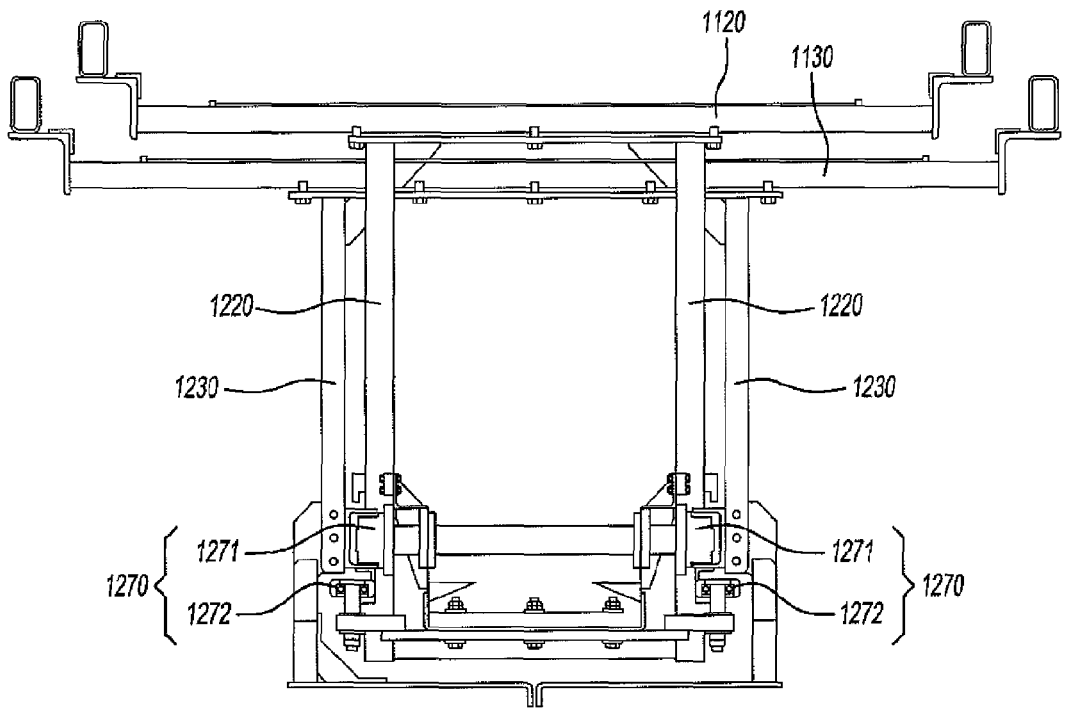
FIG. 23 is a cross section of line C in FIG. 16.
Figure 24:
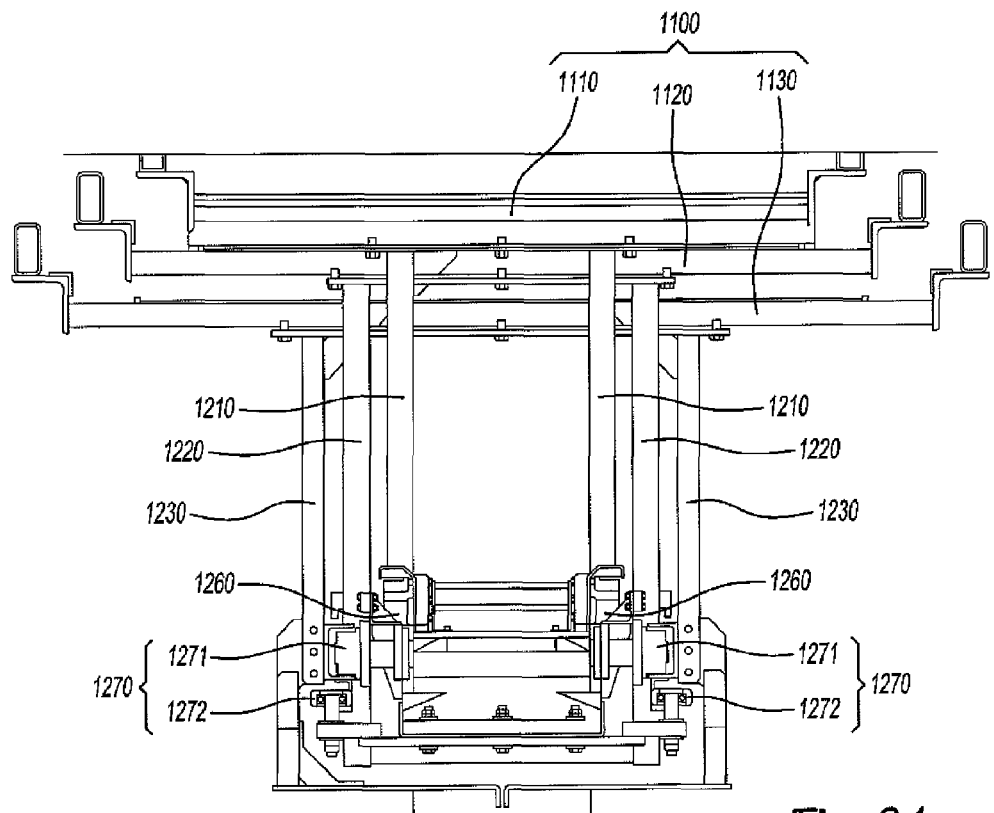
FIG. 24 is a cross section of line D in FIG. 16.
Figure 25:
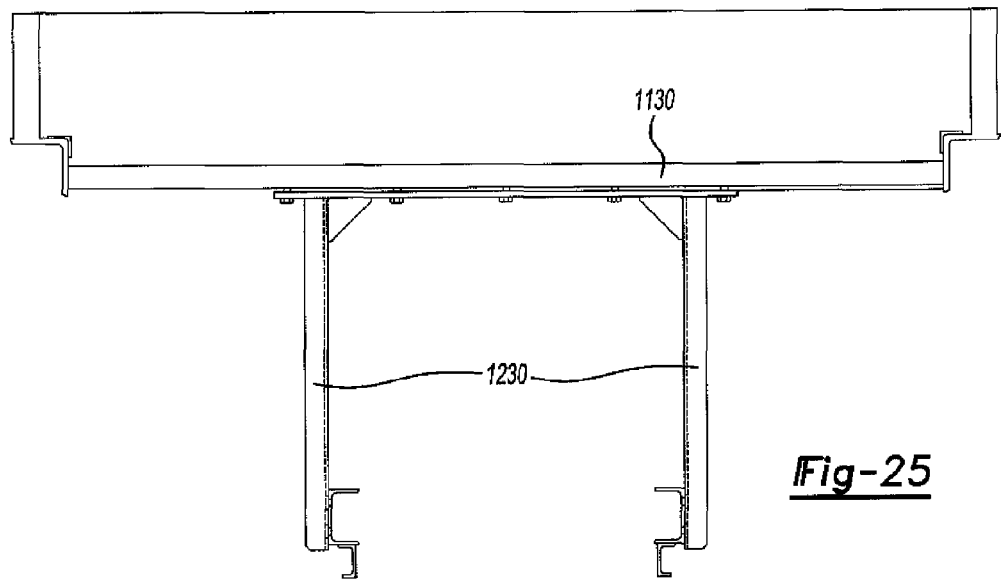
FIG. 25 is a cross section of line E in FIG. 16.

As shown in FIG. 20, the cable tray for a boarding bridge having the structure is constructed such that the third tray part (1230), second tray part (1220), and first tray part (1210), in order from the outside, are nested, and in the nesting structure, roller members are preferably installed between the first tray part (1210) and second tray part (1220) and between the second tray part (1220) and third tray part (1230), to realize smooth sliding movements by means of rolling.

FIGS. 21-25 show in detail the cross-sectional shapes of each of the third tray part (1210), second tray part (1220), and third tray part (1230) of the first application example of the present invention and the coupling structure between them. The first application example of the present invention has a structure in which a first guide roller (1260) is installed between the first tray part (1210) and second tray part (1220) and a second guide roller (1270) is installed between the second tray part (1220) and third tray part (1230).

The first guide roller (1260) is installed between the first tray part (1210) and second tray part (1220) so that the sliding movement between the first tray part (1210) and second tray part (1220) is guided by a rolling motion, and the second guide roller (1270) is installed between the second tray part (1220) and third tray part (1230) so that the sliding movement between the second tray part (1220) and third tray part (1230) is guided by a rolling motion.

The first guide roller (1260) is mounted on a rotational shaft that extends in the horizontal direction, and performs a rolling motion in a state in which it is in contact at top and bottom with the first tray part (1210) and second tray part (1220), and the second guide roller (1270) has a structure consisting of a horizontal axis roller (1271) that performs a rolling motion in a state in which it is in contact at top and bottom with the second tray part (1220) and third tray part (1230) and a vertical axis roller (1272) that performs a rolling motion in a state in which it is in contact at left and right with the second tray part (1220) and third tray part (1230).

According to the cable tray (1200) for a boarding bridge of the present invention, even if the movable second and third tunnel parts (1120, 1130) are simultaneously and repeatedly moved in a reciprocating fashion, since the first and second connection cables (1240, 1250) maintain a mutually separated state as mentioned above, the first and second connection cables (1240, 1250) can always maintain a stable wiring state without entangling each other.

Also, since stable branch wiring can be realized by means of a simple structure in which the coupling positions and the bending directions of the first and second connection cables (1240, 1250) are different in one wiring path that is formed such that the first and second tray parts (1210, 1220) are connected, multiple wiring paths for supplying power to each of the second and third tunnel parts (1120, 1130) need not be provided, so that maintenance and control as well as manufacture and installation of the cable tray can be facilitated.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. An apparatus for moving a tunnel part of a boarding bridge, including a tunnel having a first tunnel part, a second tunnel part, and a third tunnel part in sequence and that can be moved so that the second tunnel part and third tunnel part are placed in contact and connected to each other based on the first tunnel part, the apparatus comprising:
- a first rope with one end coupled with the first tunnel part and another end coupled with the third tunnel part;
- a first pulley that is fixedly coupled to the second tunnel part so that the first rope can be wound at a position that is separated in an expanding direction of the tunnel length from the other end of the first rope and is interlocked and moved in accordance with moving displacement of the other end of the first rope;
- a second rope that is installed separately from the first rope with one end coupled with the first tunnel part and another end coupled with the third tunnel part;
- a second pulley that is fixedly coupled to the second tunnel part so that the second rope can be wound at a position that is separated in a contracting direction of the tunnel length from the one end of the second rope and is interlocked and moved in accordance with moving displacement of the other end of the above-mentioned second rope; and
- a mechanism for moving the third tunnel part relative to the first tunnel part, wherein the ropes and pulleys cause movement of the second tunnel part between the first tunnel part and the third tunnel part responsive to the mechanism moving the third tunnel part.

2. The apparatus for moving a tunnel part of a boarding bridge of claim 1, wherein the first rope and second rope include rope members that extend and are formed so that their terminal parts penetrate through through-holes formed in rope supports installed on bottom plates of the first tunnel part and third tunnel part so that both ends of the first rope and second rope are locked to regular positions of the first tunnel part and third tunnel part, and
- comprising spring members that are coupled with the above-mentioned rope members so that the terminal parts of the rope members that penetrate through the rope supports are elastically pressurized in a direction opposite the extending direction of the rope members.

3. The apparatus for moving a tunnel part of a boarding bridge of claim 1, wherein the second tunnel part and third tunnel part are interlocked and moved in a state in which a bottom plate of the second tunnel part is opposite the lower side of a bottom plate of the first tunnel part and a bottom plate of the third tunnel part is opposite a lower side of the bottom plate of the second tunnel part.

4. The apparatus for moving a tunnel part of a boarding bridge of claim 1, wherein one end of the first rope is coupled to a rope support that extends downward from a lower part of a bottom plate of the first tunnel part to a position that is horizontal with respect to a bottom plate of the third tunnel part, and the other end is coupled with an upper part of the bottom plate of the third tunnel part at a position that is horizontal with respect to the one part.

5. The apparatus for moving a tunnel part of a boarding bridge of claim 1, wherein the first pulley is fixedly installed between a bottom plate of the second tunnel part and a bottom plate of the third tunnel part so that a rotational pattern of the first pulley is in a direction perpendicular to the moving direction of the second tunnel part and third tunnel part.

6. The apparatus for moving a tunnel part of a boarding bridge of claim 5, wherein the first pulley includes a bearing base that forms a circumferential protruded part at a lower part of a bottom plate of the second tunnel part and is fixedly coupled, and comprising:
- a bearing that is coupled with an outer peripheral part of the bearing base;
- a roller that is equipped with a connecting surface capable of rotating in an extending direction of the first rope and is coupled to an outer periphery of the bearing; and
- a bearing cover for fastening and fixing the bearing onto the bearing base.

7. The apparatus for moving a tunnel part of a boarding bridge of claim 1, wherein the one end of the second rope is coupled with a lower part of a bottom plate of the first tunnel part, and the other end is coupled with an upper part of a bottom plate of the third tunnel part at a height different from that of the one end.

8. The apparatus for moving a tunnel part of a boarding bridge of claim 1, wherein the second pulley has a rotational shaft tilted from a direction perpendicular to the moving direction of the second tunnel part and third tunnel part between a bottom plate of the first tunnel part and a bottom plate of the third tunnel part so that contact with one end of the second rope and contact with the other end of the second tunnel part are at different heights.

9. The apparatus for moving a tunnel part of a boarding bridge of claim 8, wherein the second pulley includes a bearing base that is coupled in a tilted state from a direction perpendicular to a moving direction of the second tunnel part and third tunnel part to a rotational shaft fixer that forms a pair of separated protruded parts between the bottom plate of the first tunnel part and the bottom plate of the third tunnel part and is fixedly coupled, and comprising:
- a bearing that is coupled with an outer peripheral part of the bearing base; and
- a roller that is equipped with a connecting surface capable of rotating in an extending direction of the second rope and is coupled with an outer peripheral part of the bearing.

10. The apparatus for moving a tunnel part of a boarding bridge of claim 1, comprising a rope holder that is equipped with a rope holding surface for holding up the first rope or second rope from a lower side and installed in a first pulley and second pulley.

11. The apparatus for moving a tunnel part of a boarding bridge of claim 1, comprising a rope guide that is installed on an extension path of the first rope or second rope so that the first rope or second rope is guided in a specific direction.

12. The apparatus for moving a tunnel part of a boarding bridge of claim 1, wherein movement of the third tunnel part relative to the first tunnel part results in movement of the second tunnel part relative to the first tunnel part in an amount that is approximately one-half of the movement of the third tunnel part relative to the first tunnel part.

13. An apparatus for moving a tunnel part of a boarding bridge, including a tunnel having a first tunnel part, a second tunnel part, and a third tunnel part in sequence and that can be moved so that the second tunnel part and third tunnel part are placed in contact and connected to each other based on the first tunnel part, the apparatus comprising:
- a first rope with one end coupled with the first tunnel part and another end coupled with the third tunnel part;
- a first pulley that is fixedly coupled to the second tunnel part so that the first rope can be wound at a position that is separated in an expanding direction of the tunnel length from the other end of the first rope and is interlocked and moved in accordance with moving displacement of the other end of the first rope;
- a second rope that is installed separately from the first rope with one end coupled with the first tunnel part and another end coupled with the third tunnel part;
- a second pulley that is fixedly coupled to the second tunnel part so that the second rope can be wound at a position that is separated in a contracting direction of the tunnel length from the one end of the second rope and is interlocked and moved in accordance with moving displacement of the other end of the above-mentioned second rope;

the second pulley has a rotational shaft tilted from a direction perpendicular to the moving direction of the second tunnel part and third tunnel part between a bottom plate of the first tunnel part and a bottom plate of the third tunnel part so that contact with one end of the second rope and contact with the other end of the second tunnel part are at different heights;

the second pulley includes a bearing base that is coupled in a tilted state from a direction perpendicular to a moving direction of the second tunnel part and third tunnel part to a rotational shaft fixer that forms a pair of separated protruded parts between the bottom plate of the first tunnel part and the bottom plate of the third tunnel part and is fixedly coupled, and comprising:

a bearing that is coupled with an outer peripheral part of the bearing base; and a roller that is equipped with a connecting surface capable of rotating in an extending direction of the second rope and is coupled with an outer peripheral part of the bearing.

* * * * *